United States Patent [19]

Fernandez et al.

[11] Patent Number: 5,254,305
[45] Date of Patent: Oct. 19, 1993

[54] INJECTION NOZZLE AND METHOD FOR CHARGING AN INJECTION NOZZLE

[75] Inventors: Louis Fernandez; Otto Hofstetter, both of Uznach, Switzerland

[73] Assignee: Otto Hofstetter AG, Switzerland

[21] Appl. No.: 767,032

[22] Filed: Sep. 26, 1991

Related U.S. Application Data

[63] Continuation-in-part of Ser. No. 630,348, Dec. 17, 1990, abandoned, which is a continuation of Ser. No. 281,197, Dec. 7, 1988, abandoned.

[30] Foreign Application Priority Data

Dec. 10, 1987 [CH] Switzerland .................. 4831/87

[51] Int. Cl.⁵ ............................................. B29C 45/38
[52] U.S. Cl. ........................... 264/328.9; 264/328.15; 425/549; 425/552; 425/564; 425/568
[58] Field of Search ........................ 239/583, 584; 264/328.1, 328.9, 328.15, 328.14, 328.16; 425/549, 564, 565, 566, 568, 571, 547, 548, 552

[56] References Cited

U.S. PATENT DOCUMENTS

| | | | |
|---|---|---|---|
| 3,780,764 | 12/1973 | Geist | 425/564 |
| 4,213,751 | 7/1980 | Fernandez | 425/566 |
| 4,238,182 | 12/1980 | Mollier | 425/566 |
| 4,378,963 | 4/1983 | Schouenberg | 425/564 |
| 4,412,807 | 11/1983 | York | 425/564 |
| 4,592,711 | 6/1986 | Capy | 425/564 |
| 4,657,496 | 4/1987 | Ozeki et al. | 425/564 |
| 4,663,811 | 5/1987 | Gellert | 425/564 |
| 4,795,126 | 1/1989 | Crandell | 425/549 |
| 4,925,384 | 5/1990 | Männer | 425/564 |
| 4,964,795 | 10/1990 | Tooman | 425/549 |
| 5,059,113 | 10/1991 | Ito et al. | 425/564 |
| 5,078,589 | 1/1992 | Osuna et al. | 425/564 |

FOREIGN PATENT DOCUMENTS

| | | |
|---|---|---|
| 2614911 | 10/1976 | Fed. Rep. of Germany. |
| 3237924 | 4/1984 | Fed. Rep. of Germany. |
| 2333633 | 7/1977 | France. |

*Primary Examiner*—Jill L. Heitbrink
*Attorney, Agent, or Firm*—Lerner, David, Littenberg, Krumholz & Mentlik

[57] ABSTRACT

A nozzle for injecting a moldable material has a nozzle body which defines a nozzle channel leading to the nozzle outlet. The nozzle outlet is controlled by an axially slidable nozzle pin extending coaxially through the nozzle channel. A guide sleeve slidably supports the nozzle pin until it reaches the region adjacent the nozzle outlet. As a result, the length along which the nozzle pin is exposed to the moldable material is significantly reduced, thereby substantially eliminating the bending stresses applied to the nozzle pin by the pressure asymmetries in the incoming moldable material. The nozzle pin may also be retracted fully within the guide sleeve to provide an unobstructed path for the moldable material to flow through and consolidate as it approaches the nozzle outlet. With this arrangement, the incoming moldable material may be conveyed towards the nozzle channel asymmetrically with respect to the axis of the nozzle pin without any deleterious effect.

22 Claims, 2 Drawing Sheets

FIG. 2(d) FIG. 2(e)

INJECTION NOZZLE AND METHOD FOR CHARGING AN INJECTION NOZZLE

CROSS-REFERENCE TO RELATED APPLICATIONS

This application is a continuation-in-part of application Ser. No. 07/630,348 filed Dec. 17, 1990, now abandoned, which was a continuation of application Ser. No. 07/281,197 filed Dec. 7, 1988, now abandoned.

BACKGROUND OF THE INVENTION

1. Field of the Invention

The present invention relates to an injection nozzle for feeding an injectable material to a mold cavity and, more particularly, to an injection nozzle which is capable of injecting difficult materials, such as polyethylene terephthalate (PET) plastic. Even more particularly, the present invention is directed to an injection nozzle having a guide sleeve for supporting and guiding a nozzle pin between a retracted position in which the exit orifice from the nozzle is open and an extended position in which the exit orifice is closed. The present invention further relates to an injection molding installation having such a nozzle.

2. Prior Art

One method for charging an injection nozzle with a moldable material is disclosed in U.S. Pat. No. 4,213,751, wherein a thermoplastic material is molded to form blanks which are subsequently formed into plastic bottles by a blow-molding process. An injection nozzle for use in this process is shown schematically in FIG. 1. In this arrangement, a nozzle 1 includes an axially extending nozzle channel section 7 which communicates with a nozzle orifice 5 arranged in nozzle head 3 for the delivery of a moldable material. A nozzle pin 9, coaxially arranged in nozzle channel 7, may be axially displaced in the direction of arrow A into or out from orifice 5. As used herein, a nozzle pin channel refers to the portion of the nozzle channel through which the nozzle pin travels in direct communication with the moldable material. Thus, referring to FIG. 1, the axial length of nozzle pin channel 6 is equal to the axial length of the nozzle channel 7 and is substantially longer than the diameter of nozzle pin 9.

The moldable material is injected radially in a hot, liquid state from a feed pipe 13 into nozzle channel 7 through an inlet opening 11 located at a spaced distance from orifice 5. Considering a cross-sectional area of nozzle channel 7 along line Q—Q, when the moldable material is injected through inlet opening 11 under pressure, a distribution of pressure p results around the circumference of nozzle pin 9, all of which is shown qualitatively in FIG. 1(b). The material flowing into injection nozzle 1 creates a pressure in nozzle channel 7 which is greater on the side of nozzle pin 9 facing inlet opening 11 than on the side of nozzle pin 9 facing away from inlet opening 11. As a result of this non-uniform pressure distribution, a bending stress is exerted on nozzle pin 9 which causes the nozzle pin to deflect from its original straight shape, depending on the position of nozzle pin 9 relative to the nozzle orifice 5. In particular, with the nozzle pin 9 retracted from orifice 5, the injection of moldable material under pressure deflects the free end or tip of nozzle pin 9, as shown in phantom lines in FIG. 1(a), so that it is no longer aligned with nozzle orifice 5. When nozzle pin 9 is then extended to seal nozzle orifice 5, this deflection causes both the tip of the nozzle pin and the nozzle orifice to wear excessively. The exertion of even a very small bending force in the retracted position of nozzle pin 9 will cause an intolerable deflection of the nozzle pin tip relative to its tight tolerances with nozzle orifice 5.

It is known from U.S. Pat. No. 4,412,807 that, in order to solve this problem, the nozzle pin may be guided in a sleeve until it is directly in front of the nozzle orifice. The nozzle channel runs along one side of the guide sleeve in a circularly shaped passage eccentrically disposed relative to the central axis of the nozzle, turning toward the nozzle orifice at the end of the guide sleeve. This arrangement has the disadvantage that the asymmetrical flow of the moldable material to the nozzle orifice causes asymmetrical friction and thus uneven heating of the conveyed material, thereby leading to asymmetries in the delivery of the material into a mold. This problem is exaggerated when processing PET materials, which are very sensitive to temperature changes and gradients.

It has further become known from the German laid-open specification OS 26 14 911 that in an injection nozzle having the same basic structure as that in U.S. Pat. No. 4,213,751, a sleeve may be provided up to the vicinity at which the moldable material enters the nozzle channel from the feed pipe Such structure, however, does not overcome the problems associated with an asymmetrical material feed since such pressure asymmetries extend further down the nozzle channel toward the nozzle orifice.

French application No. 2,333,633 discloses a method for charging an injection nozzle in which a nozzle pin is axially displaceable to open or close a nozzle orifice. The nozzle pin runs in a sleeve having a heating coil for heating the nozzle pin. An outer sleeve holds the heating coil and extends into the immediate vicinity of the nozzle orifice at which point the nozzle pin protrudes therefrom. The injection nozzle further includes a coaxial channel arranged around the sleeve and symmetrical to the nozzle pin with respect to the nozzle orifice axis. The moldable material is fed to the coaxial channel through pairs of passages arranged axially and symmetrically at a spaced distance from the orifice. This symmetrical feed prevents the formation of any pressure asymmetries, and the sleeve thus provided serves exclusively to protect the heating coil. As a result of this symmetrical feed, a bending stress does not develop.

The injection nozzles described above have limited application in that they are only suitable for injecting materials which have favorable flow characteristics over a wide temperature range. However, many materials are heat sensitive, such that overexposure to heat will destroy their physical properties. One such material which is affected deleteriously by heat is PET thermoplastic. PET is extremely temperature sensitive, has a very low coefficient of thermal conductivity, is pressure sensitive and changes its optical characteristics if turbulence occurs during processing. In view of these properties, PET is intolerant of other than very small temperature gradients and requires a relatively large and unobstructed flow path and is therefore nearly impossible to mold using conventional injection nozzles There therefore exists a need for a simple, high-quality injection nozzle which will not have a deleterious effect on the material being injected, which will provide an injected workpiece which is defect free, and which will overcome the many deficiencies previously encountered in prior art injection nozzles.

SUMMARY OF THE INVENTION

In accordance with one aspect of the present invention, these needs have now been addressed by the invention of an injection nozzle which is particularly constructed for use with materials that are difficult to inject, such as PET. The injection nozzle consists of a nozzle body defining a nozzle channel having a first end and a second end, inlet means adjacent the first end of the nozzle channel for introducing the moldable material into the nozzle channel, a nozzle outlet having an outlet diameter connected to the nozzle body at the second end of the nozzle channel, a nozzle pin having a pin diameter slidably disposed in an axial direction in the nozzle channel between a first position to open the nozzle outlet and a second position to close the nozzle outlet, guide sleeve means for slidably supporting the nozzle pin in the nozzle channel, the guide sleeve means having a fixed end connected to the nozzle body adjacent the first end of the nozzle channel and a free end adjacent the nozzle outlet, nozzle pin channel means disposed between the free end of the guide sleeve means and the nozzle outlet, the nozzle pin channel means having a length which is substantially equal to the pin diameter, and distribution means for directing the moldable material in direct contact with the guide sleeve means from the inlet means to the nozzle pin channel means.

In accordance with one embodiment of the injection nozzle, the outlet diameter is substantially equal to the length of the nozzle pin channel means. In a preferred embodiment of this injection nozzle, the guide sleeve means has a first inner diameter adjacent the free end which is substantially equal to the pin diameter and a second inner diameter adjacent the fixed end which is larger than the first inner diameter, whereby the guide sleeve means sealingly engages the nozzle pin to prevent the moldable material from entering the guide sleeve means.

In accordance with another embodiment of the present invention, the injection nozzle includes heating means disposed exterior of the nozzle channel for heating the guide sleeve means. In preferred embodiments, the heating means heats the guide sleeve means through the fixed end and the guide sleeve means conducts the heat to its free end.

In still another embodiment of the injection nozzle, the inlet means introduces the moldable material into the nozzle channel with a pressure distribution which is asymmetrical in radial directions with respect to the axial direction.

In yet another embodiment of the present invention, the distribution means consists of a toroidal chamber extending around the guide sleeve means between the fixed end and the free end. In preferred embodiments of this injection nozzle, the nozzle pin channel means consists of an annular chamber for consolidating the moldable material between the distribution means and the nozzle outlet.

Another aspect of the present invention provides an injection molding installation having at least one injection nozzle for injecting a moldable material into a mold cavity. The injection nozzle consists of a nozzle body defining a nozzle channel having a first end and a second end, inlet means adjacent the first end of the nozzle channel for introducing the moldable material into the nozzle channel, a nozzle outlet having an outlet diameter connected to the nozzle body at the second end of the nozzle channel, a nozzle pin having a pin diameter slidably disposed in an axial direction in the nozzle channel between a first position to open the nozzle outlet and a second position to close the nozzle outlet, guide sleeve means for slidably supporting the nozzle pin in the nozzle channel, the guide sleeve means having a fixed end connected to the nozzle body adjacent the first end of the nozzle channel and a free end adjacent the nozzle outlet, nozzle pin channel means disposed between the free end of the guide sleeve means and the nozzle outlet, the nozzle pin channel means having a length which is substantially equal to the pin diameter, and distribution means for directing the moldable material in direct contact with the guide sleeve means from the inlet means to the nozzle pin channel means.

In accordance with one embodiment of this invention, the injection molding installation further includes thermal insulation means interposed between the mold bottom and the nozzle body. In a preferred embodiment of this injection molding installation the thermal insulation means comprises stainless steel. In another preferred embodiment of this injection molding installation, the at least one injection nozzle further includes heating block means for heating the moldable material within the inlet means, and thermal connection means for thermally connecting the heating block means to the nozzle body. In more preferred embodiments, the thermal connection means comprises steel.

Yet another aspect of the present invention provides a method for injecting a moldable material, particularly PET, through an injection nozzle to a mold cavity, wherein the injection nozzle includes a nozzle body defining a nozzle channel having a first end and a second end, inlet means adjacent the first end of the nozzle channel for introducing the moldable material into the nozzle channel, a nozzle outlet having an outlet diameter connected to the nozzle body at the second end of the nozzle channel, a nozzle pin having a pin diameter slidably disposed in an axial direction in the nozzle channel between a first position to open the nozzle outlet and a second position to close the nozzle outlet, guide sleeve means for slidably supporting the nozzle pin in the nozzle channel, the guide sleeve means having a fixed end connected to the nozzle body adjacent the first end of the nozzle channel and a free end adjacent the nozzle outlet, nozzle pin channel means disposed between the free end of the guide sleeve means and the nozzle outlet, the nozzle pin channel means having a length which is substantially equal to the pin diameter, and distribution means for directing the moldable material from the inlet means to the nozzle pin channel means. The method consists of providing the moldable material to the nozzle chamber, and conveying the moldable material through the distribution means in direct contact with the guide sleeve means from the inlet means to the nozzle pin channel means and then to the nozzle outlet, wherein the length of the nozzle channel with respect to the pin diameter substantially eliminates deflection of the nozzle pin from the axial direction.

In accordance with one embodiment of the method of the present invention, the moldable material is provided to the nozzle channel with a pressure distribution which is asymmetrical in radial directions with respect to the axial direction, and wherein the moldable material is conveyed with the asymmetric pressure distribution to the nozzle outlet.

In another embodiment of the method of the present invention, the distribution means comprises a toroidal chamber extending around the guide sleeve means between the fixed end and the free end, the method further consisting of consolidating the moldable material in the nozzle pin channel between the free end of the guide sleeve and the nozzle orifice.

In yet another embodiment, the method of the present invention further consists of heating the guide sleeve means by heating means disposed exterior of the nozzle channel, and conveying the moldable material through the distribution means in direct contact with the heated guide sleeve means, whereby the guide sleeve means heats the moldable material.

BRIEF DESCRIPTION OF THE DRAWINGS

A more complete appreciation of the subject matter of the present invention and the various advantages thereof can be realized by reference to the following detailed description, in which reference is made to the accompanying drawings, in which:

FIG. 2(d) is a highly schematic sectional view taken along line $Q_1$—$Q_1$ of FIG. 2(a), also schematically showing the resulting pressure distribution at that location in the injection nozzle;

FIG. 2(e) is a highly schematic sectional view taken along line $Q_2$—$Q_2$ of FIG. 2(a), also schematically showing the resulting pressure distribution at that location in the injection nozzle.

DETAILED DESCRIPTION OF A PREFERRED EMBODIMENT

Figure 1A:
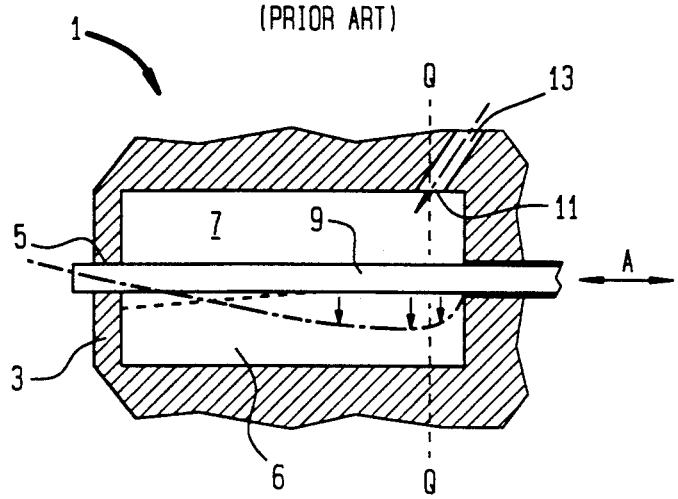
FIG. 1(a) is a highly schematic, partially sectional side view of an injection nozzle of the prior art.
Figure 1B:
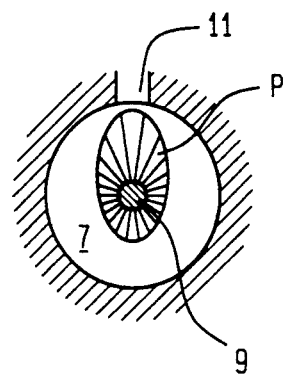
FIG. 1(b) is a highly schematic sectional view taken along line Q—Q of FIG. 1(a), also schematically showing the resulting pressure distribution therein.
Figure 2A:
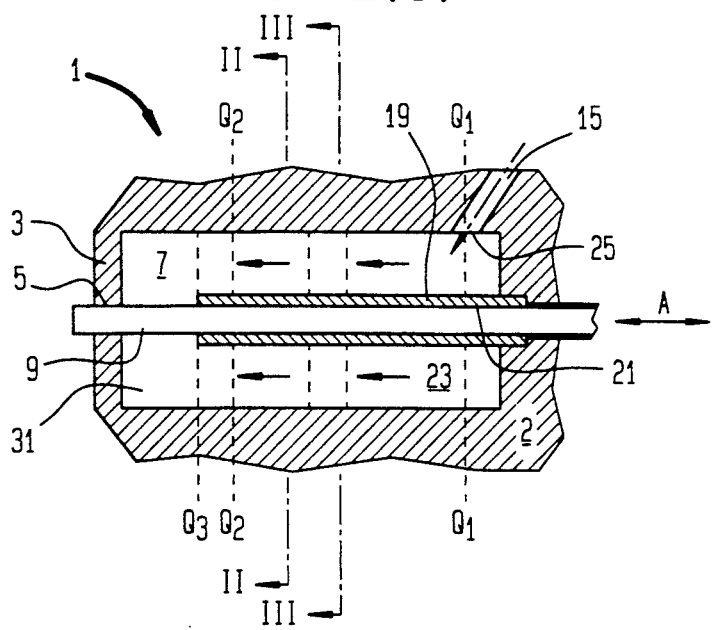
FIG. 2(a) is a highly schematic, partially sectional side view of an injection nozzle in accordance with the present invention, also schematically showing the resulting pressure distribution therein.
Figure 2B:
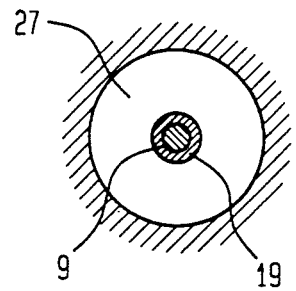
FIG. 2(b) is a highly schematic sectional view taken along line II—II of FIG. 2(a)
Figure 2C:
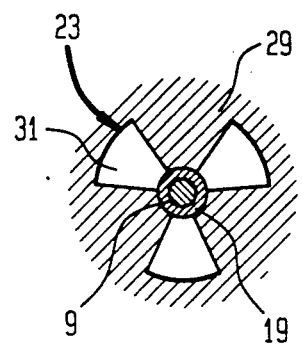
FIG. 2(c) is a highly schematic sectional view taken along line III—III of FIG. 2(a), wherein the injection nozzle includes optional brace members which are shown in cross-section.
Figure 2C:
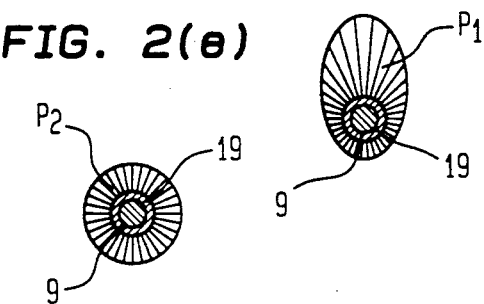

Referring to the figures, in which like reference numerals refer to like portions thereof, FIG. 2(a) shows a nozzle 1 according to the present invention. Nozzle 1 includes a nozzle body 2 defining a nozzle channel 7. At one end of nozzle body 2, nozzle channel 7 is closed by a nozzle head 3 having a nozzle orifice 5 disposed therein. A guide sleeve 19 having an axial bore 21 extends through nozzle channel 7 from one end fixedly connected to the nozzle body 2 to a free end disposed adjacent nozzle orifice 5, thereby forming a toroidal chamber 27 coaxially with guide sleeve 19. A nozzle pin 9, the diameter of which is substantially the same as the diameter of nozzle orifice 5, is assembled in the bore 21 of guide sleeve 19 and is axially moveable in the direction of arrow A between an extended position in which nozzle orifice 5 is closed by nozzle pin 9, and a retracted position in which nozzle orifice 5 is open. Between the free end of guide sleeve 19 and nozzle orifice 5, nozzle pin 9 extends through a nozzle pin channel 31 which is that portion of nozzle channel 7 through which the nozzle pin travels in direct communication with the moldable material. As will be discussed more fully below, the length of nozzle pin channel 31 is approximately equal to the diameters of nozzle pin 9 and nozzle orifice 5.

Toroidal chamber 27 defines a distribution channel 23 through which moldable material can flow towards the nozzle orifice 5 in direct contact with guide sleeve 19, while not coming into contact with nozzle pin 9. In view of the foregoing, the charging of this distribution channel 23 can now be effected asymmetrically with respect to nozzle pin 9 by injecting a moldable material from a single feed pipe 15 through an inlet opening 25 which enters distribution channel 23 at a spaced distance from the free end of guide sleeve 19. While the moldable material flows forward, a balance of pressure may be created so that the uneven distribution of pressure $p_1$ in the vicinity of inlet opening 25 (shown qualitatively in FIG. 2(d) in the cross-sectional area of nozzle 1 taken along line $Q_1$—$Q_1$) may dissipate and result in a substantially uniform distribution of pressure $p_2$ around the periphery of the guide sleeve in the region closer to the free end of guide sleeve 19, for example, in the cross-sectional view of nozzle 1 taken along line $Q_2$—$Q_2$, as shown in FIG. 2(e).

By feeding the moldable material parallel to the axis of the nozzle pin but not in contact therewith, the axial free length L of the nozzle pin 9 (i.e., the length of nozzle pin 9 which extends through nozzle pin channel 31) is substantially reduced. Therefore, should any residual pressure asymmetry remain near the free end of guide sleeve 19, the effect of such asymmetry will be significantly reduced by the unique geometry of the injection nozzle herein. That is, since the length of nozzle pin channel 31 is substantially the same as the diameter of nozzle pin 9 and significantly smaller than the length of nozzle channel 7, the bending stress exerted on the free length of nozzle pin 9 as a result of such pressure asymmetry will be insufficient to deflect the nozzle pin tip from its alignment with nozzle orifice 5.

There are several advantages to substantially reducing the length along which the nozzle pin 9 comes into direct contact with the moldable material. Firstly, such reduction in contact area results in a concomitant reduction in the frictional forces which must be overcome in order to extend or retract nozzle pin 9. Other advantages stem from the fact that nozzle pin 9 is in contact with components which operate at relatively cold temperatures—the cold mold cavity at its tip end, and the base plate (not shown) of the injection machine which operates at room temperature at its other end. Thus, reducing the length of nozzle pin channel 31 results in a corresponding reduction in the amount of heat transferred from the moldable material through nozzle pin 9 as it communicates on the other side of nozzle orifice 5 with the colder environment of the mold. Not only does this reduce the flow of heat and thus the heat losses from the moldable material outwardly through the nozzle pin 9, but it also prevents the moldable material from cooling off in nozzle pin channel 31, thereby substantially reducing the danger that the moldable material in that portion of the nozzle may turn extremely viscous when nozzle orifice 5 is closed by nozzle pin 9, which would make further injection difficult, if not impossible. On the other hand, guide sleeve 19 is in direct contact with the heated portions of nozzle 1 and, being formed from a material having a high thermal conductivity, such as steel or a beryllium alloy, maintains a substantially uniform temperature along its entire length. Consequently, through its direct and intimate contact with guide sleeve 19, the moldable material remains fluid as it passes through distribution channel 23.

To increase the stability of the free end of guide sleeve 19, a bracing arrangement having bracing legs 29 may optionally be provided. In such an embodiment, shown in the cross-sectional view of FIG. 2 (c), continuous channels parallel to the axis of nozzle pin 9 can extend through toroidal chamber 27 from inlet opening 25 to the free end of guide sleeve 19; that is, to the inlet zone of nozzle pin channel 31.

Figure 3:
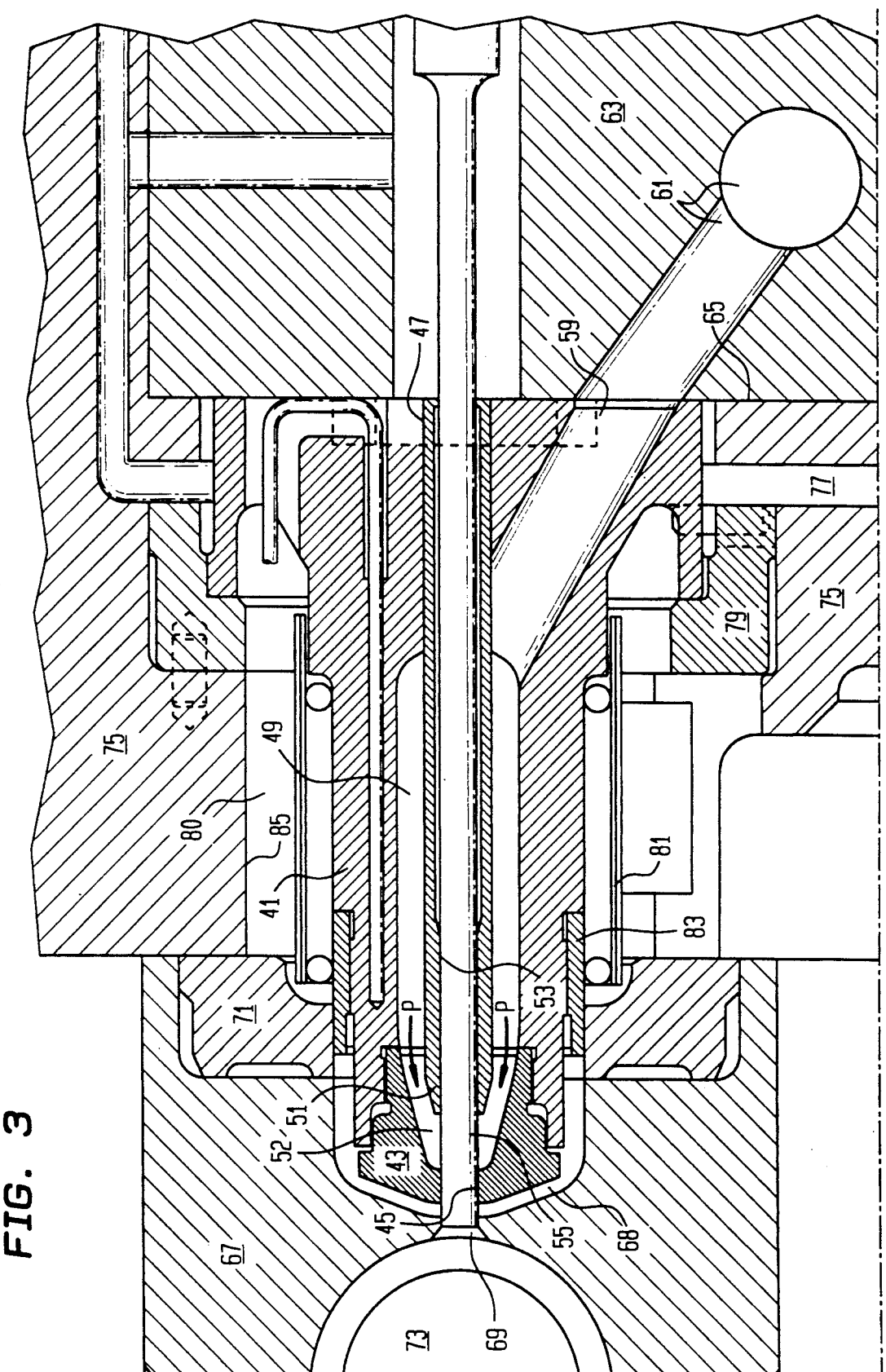
FIG. 3 is a highly schematic sectional side view of an injection molding installation incorporating the injection nozzle of the present invention.

By means of a detailed representation of an injection molding installation of the present invention in longitudinal section, FIG. 3 shows an injection nozzle constructed in general accordance with FIGS. 2(a) and (b). The injection nozzle includes a nozzle head 43 having a nozzle orifice 45 therethrough. Nozzle head 43 is tightly mounted to a nozzle cylinder 41. A guide sleeve 47 is mounted at the end of the nozzle cylinder 41 remote from the nozzle head 43, and extends to a conically tapered free end 51 in the vicinity of nozzle orifice 45.

Guide sleeve 47 has a central bore 53 in which a nozzle pin 55 is slidably assembled for longitudinal displacement. In the region proximate free end 51, the bore 53 in guide sleeve 47 has a diameter which sealingly engages nozzle pin 55 so as to prevent the leakage of any moldable material into guide sleeve 47. However, in order to reduce the frictional resistance which has to be overcome when the nozzle pin 55 is displaced, bore 53 is formed with a slightly larger diameter in the region of guide sleeve 47 remote from free end 51, thereby providing clearance between guide sleeve 47 and nozzle pin 55 so that nozzle pin 55 is only mechanically supported therein in an axially displaceable manner.

A toroidal distribution chamber 49 is defined between guide sleeve 47 and nozzle cylinder 41 so that it is coaxial to the nozzle orifice 45. At the end remote from nozzle orifice 45, a feed pipe 59 delivers a moldable material to distribution chamber 49 under pressure. In particular, in an injection molding installation with two or more injection nozzles, the feed pipe is charged with the moldable material from a distribution system 61 which passes through a hot runner block 63, heated in a known manner. The nozzle cylinder 41 is connected to the hot runner block 63 in such a manner that it intimately contacts the surface 65 thereof. By making the nozzle cylinder 41 from a material having high thermal conductivity, such as steel, heat will readily flow through nozzle cylinder 41 from hot runner block 63. Under thermally stable conditions, this ensures that the temperature in the area of nozzle head 43 will deviate only slightly from the temperature of block 63.

A mold bottom 67 having a feed opening 69 in alignment with the nozzle orifice 45 is provided on the frontal side of nozzle head 43. A toroidal cavity 68, formed between nozzle head 43 and mold bottom 67, communicates with both the nozzle orifice 45 and feed opening 69. Connecting members 71 and 83, formed from a material having low thermal conductivity, such as stainless steel, are arranged between the mold bottom 67 and nozzle cylinder 41 The low thermal conductivity of connecting members 71 and 83 permits only a relatively small amount of heat to be transferred from the heated nozzle head/nozzle cylinder arrangement through the mold bottom 67 to the molding zone 73 in which a workpiece is molded. In one example, the workpiece may comprise a blank of a thermoplastic material which is later to be blow-molded to form a plastic bottle.

The hot runner block 63 is mounted on a cold block plate 75, which is sectionally insulated from the hot block 63 by means of air gap 77, which insulation is provided to minimize heat losses from the hot block 63. The nozzle cylinder 41 is also connected to cold block plate 75 in such manner that there is little thermal conductivity therebetween. In that regard, connecting members 79, formed from a material having a low thermal conductivity, such as stainless steel or other such material, are arranged between cold block plate 75 and nozzle cylinder 41.

To assure the nozzle temperature and facilitate the easy assembly and disassembly of the nozzle, the nozzle assembly is installed in a mounting sleeve 80 provided in cold block plate 75. The mounting sleeve 80 includes a heater 81 and a bore 85 into which the nozzle assembly can be inserted from the right side as shown in FIG. 3. With the nozzle assembly in place, the mold bottom 67 is assembled over the connecting members 71 and 83. Finally, the hot block 63 is connected at the opposite end of the nozzle assembly, e.g., by means of screws, to serve as a counter flange.

In operation, a moldable material, such as a thermoplastic material, and particularly PET plastic, is fed from the distribution system 61 in the hot runner block 63 eccentrically through the pipe 59 to the distribution chamber 49. The material then flows through distribution chamber 49 in direct and intimate contact with guide sleeve 47 towards and into the nozzle pin channel 52 which lies directly adjacent nozzle orifice 45. The longitudinal length of nozzle pin 55 in the nozzle pin channel 52 is about the same size as its diameter dimension and is substantially less than the axial length of distribution chamber 49. The pressure asymmetries in the moldable material dissipate as the material flows through distribution chamber 49 so that the moldable material will preferably contact nozzle pin 55 in the nozzle pin channel 52 with an evenly distributed pressure p, although as noted above, this is not required. Nozzle pin 55 may then be retracted fully within guide sleeve 47 so as to provide an uninterrupted passageway from distribution chamber 49 through nozzle pin channel 52 and into nozzle orifice 45. As it flows from toroidal distribution chamber 49 and into nozzle pin channel 52, the moldable material will knit together to form a uniform mass before passing through nozzle orifice 45 so that the work piece that is molded does not contain any knit lines or other imperfections. Thus, the nozzle pin channel 52 serves as an annular consolidation area in which these knit lines may be eliminated. The need for such a consolidation area is particularly important when molding heat-sensitive thermoplastic materials, such as PET. These materials are typically viscous and may not readily consolidate prior to entering the nozzle orifice. However, contrary to conventionally molded materials, the heat sensitivity of these materials will not permit their temperature from being raised in order to lower their viscosity. Accordingly, it is important that the injection nozzle for such materials have a consolidation area in the region before the nozzle orifice. This consolidation area must be of a sufficient size to permit these viscous materials to substantially consolidate prior to entering the nozzle orifice, and must have a particular geometry to prevent the development of turbulence which causes opaque regions in the material, all so that defect-free work pieces may be injected therefrom. This is particularly important in those cases in which materials such as PET are being injected to form blanks which will be subject to later processing steps. Thus, for example, blanks of PET material may be injected for later processing into thin-walled beverage bottles and the like. Any defects which may be present in the blank will prevent the blank from being used to form useable beverage bottles. For instance, knit lines which may be present in the blank will become weak areas or even holes in the beverage bottle, rendering the bottle unuseable. Furthermore, the effect of excess heat or turbulence on the optical or physical properties of the PET material will be magnified when the blank is further processed into an article having thin walls.

In any event, once consolidated in the nozzle pin channel 52, the moldable material will readily flow through nozzle orifice 45 and feed opening 69, and into the molding zone 73 of mold bottom 67 to form the desired shape. On the first injection cycle the toroidal cavity 68 fills with the moldable material to thereby provide additional thermal insulation between mold bottom 67 and the nozzle components. In addition, the small axial length of nozzle pin channel 52 in which the moldable material comes into contact with the nozzle pin 55 ensures, as mentioned above, only a slight thermal transfer from the moldable material through nozzle pin 55, and thus a reduced flow of heat from the moldable material in nozzle pin channel 52 into the environment (i.e. the molding zone 73) when the nozzle orifice 45 is closed. This, in turn, prevents any substantial increase in the viscosity of the moldable material in the nozzle pin channel 52.

The reduced heat loss from the moldable material in nozzle pin channel 52 prevents an increase in the frictional resistance which must be overcome to retract the nozzle pin 55 and also prevents the formation of a plug of moldable material having a higher viscosity which has to be pushed out at the beginning of the injection cycle. This benefit is obtained despite the fact that, with the small quantity of moldable material in the small-volume nozzle pin channel 52, the heat capacity therein is relatively small.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A method for injecting a moldable material through an injection nozzle to a mold cavity, said injection nozzle including a nozzle body defining a nozzle channel extending in an axial direction and having a first end and a second end, inlet means adjacent said first end of said nozzle channel for introducing the moldable material into said nozzle channel, a nozzle outlet having an outlet diameter connected to said nozzle body at said second end of said nozzle channel, a nozzle pin having a pin diameter slidably disposed in said axial direction in said nozzle channel between a first position to open said nozzle outlet and a second position to close said nozzle outlet, guide sleeve means for slidably supporting said nozzle pin in said nozzle channel, said guide sleeve means having one end immovably connected with respect to said nozzle body adjacent said first end of said nozzle channel and a free end proximate said nozzle outlet, a nozzle pin channel disposed between said free end of said guide sleeve means and said nozzle outlet, said nozzle pin channel having a length which is substantially equal to said pin diameter, and distribution means in said nozzle channel for directing the moldable material from said inlet means to said nozzle pin channel, said method comprising the steps of:

providing the moldable material to said nozzle channel with a pressure distribution which is asymmetrical in radial directions with respect to said axial direction, and conveying the moldable material with said asymmetrical pressure distribution and with a substantially uniform temperature distribution through said distribution means in direct contact with an outside surface of said guide sleeve means from said inlet means to said nozzle pin channel and then to said nozzle outlet, wherein said length of said nozzle pin channel with respect to said pin diameter substantially prevents deflection of said nozzle pin from said axial direction.

2. The method as claimed in claim 1 wherein the moldable material is a PET plastic material.

3. The method as claimed in claim 1 wherein said distribution means comprises a toroidal chamber extending around said guide sleeve means between said one end and said free end, and wherein said method further comprises consolidating the moldable material in said nozzle pin channel between said free end of said guide sleeve means and said nozzle outlet.

4. The method as claimed in claim 1 further comprising the steps of indirectly heating said guide sleeve means by heating means disposed radially exterior of said nozzle channel and said guide sleeve means with respect to said axial direction, and conveying the moldable material through said distribution means in direct contact with said heated guide sleeve means, whereby said guide sleeve means heats the moldable material.

5. An injection nozzle for injecting a moldable material into a mold cavity, comprising a nozzle body defining a nozzle channel extending in an axial direction and having a first end and a second end, inlet means adjacent said first end of said nozzle channel for introducing the moldable material into said nozzle channel with a pressure distribution which is asymmetrical in radial directions with respect to said axial direction, a nozzle outlet having an outlet diameter connected to said nozzle body at said second end of said nozzle channel, a nozzle pin having a pin diameter slidably disposed in said axial direction in said nozzle channel between a first position to open said nozzle outlet and a second position to close said nozzle outlet, guide sleeve means for slidably supporting said nozzle pin in said nozzle channel, said guide sleeve means having one end immovably connected with respect to said nozzle body adjacent said first end of said nozzle channel and a free end proximate said nozzle outlet, a nozzle pin channel disposed between said free end of said guide sleeve means and said nozzle outlet, said nozzle pin channel having a length which is substantially equal to said pin diameter, and distribution means in said nozzle channel for directing the moldable material in direct contact with an outside surface of said guide sleeve means from said inlet means to said nozzle pin channel.

6. The injection nozzle as claimed in claim 5 wherein said outlet diameter is substantially equal to said length of said nozzle pin channel.

7. The injection nozzle as claimed in claim 6 wherein said guide sleeve mans has a first inner diameter adjacent said free end which is substantially equal to said pin diameter and a second inner diameter adjacent said one end which is larger than said first inner diameter, whereby said guide sleeve means sealingly engages said nozzle pin to prevent the moldable material from entering said guide sleeve means.

8. The injection nozzle as claimed in claim 5 further comprising heating means disposed radially exterior of said nozzle channel and said guide sleeve means with respect to said axial direction for indirectly heating said guide sleeve means.

9. The injection nozzle as claimed in claim 8 wherein said heating means heat said guide sleeve means primarily through said one end, and wherein said guide sleeve means conducts said heat to said free end.

10. The injection nozzle as claimed in claim 5 wherein said distribution means comprises a toroidal chamber extending around said guide sleeve means between said fixed end and said free end.

11. The injection nozzle as claimed in claim 10 wherein said nozzle pin channel comprises an annular chamber for consolidating the moldable material between said distribution means and said nozzle outlet.

12. An injection molding installation having at least one injection nozzle for injecting a moldable material into a mold cavity, comprising a nozzle body defining a nozzle channel extending in an axial direction and having a first end and a second end, inlet means adjacent said first end of said nozzle channel for introducing the moldable material into said nozzle channel with a pressure distribution which is asymmetrical in radial directions with respect to said axial direction, a nozzle outlet having an outlet diameter connected to said nozzle body at said second end of said nozzle channel, a nozzle pin having a pin diameter slidably disposed in said axial direction in said nozzle channel between a first position to open said nozzle outlet and a second position to close said nozzle outlet, guide sleeve means for slidably supporting said nozzle pin in said nozzle channel, said guide sleeve means having one end immovably connected with respect to said nozzle body adjacent said first end of said nozzle channel and a free end proximate said nozzle outlet, a nozzle pin channel disposed between said free end of said guide sleeve means and said nozzle outlet, said nozzle pin channel having a length which is substantially equal to said pin diameter, distribution means in said nozzle channel for directing the moldable material in direct contact with an outside surface of said guide sleeve means from said inlet means to said nozzle pin channel, a mold bottom having a feed opening aligned with said nozzle outlet, and an annular gap between said mold bottom and said nozzle body in communication with said nozzle outlet and said feed opening.

13. The injection molding installation as claimed in claim 12 further comprising thermal insulation means interposed between said mold bottom and said nozzle body.

14. The injection molding installation as claimed in claim 13 wherein said thermal insulation means comprises stainless steel.

15. The injection molding installation as claimed in claim 13 wherein said at least one injection nozzle further comprises heating block means for heating the moldable material within said inlet means, and thermal connection mans for thermally connecting said heating block means to said nozzle body.

16. The injection molding installation as claimed in claim 15 wherein said thermal connection means comprises steel.

17. The injection molding installation as claimed in claim 12 wherein said outlet diameter is substantially equal to said length of said nozzle pin channel.

18. The injection molding installation as claimed in claim 12 further comprising heating means disposed radially exterior of said nozzle channel and said guide sleeve means with respect to said axial direction for indirectly heating said guide sleeve means.

19. The injection molding installation as claimed in claim 15 wherein said heating means heats said guide sleeve means primarily through said one end, and wherein said guide sleeve means conducts said heat to said free end.

20. The injection nozzle as claimed in claim 12 wherein said distribution means comprises a toroidal chamber extending around said guide sleeve means between said one end and said free end.

21. The injection nozzle as claimed in claim 20 wherein said nozzle pin channel comprises an annular chamber for consolidating the moldable material between said distribution mans and said nozzle outlet.

22. The injection nozzle as claimed in claim 15 wherein said heating block means is thermally coupled to said guide sleeve means for heating said guide sleeve means.

* * * * *

UNITED STATES PATENT AND TRADEMARK OFFICE
CERTIFICATE OF CORRECTION

PATENT NO. : 5,254,305

DATED : October 19, 1993

INVENTOR(S) : LOUIS FERNANDEZ; OTTO HOFSTETTER

It is certified that error appears in the above-identified patent and that said Letters Patent is hereby corrected as shown below:

Column 7, line 67, after "41" and before "The", insert --.--.

Column 11, line 11, "mans" should read --means--.

Column 12, line 27, "mans" should read --means--.

Column 12, line 41, "15" should read --18--.

Column 12, line 52, "mans" should read --means.

Signed and Sealed this

Fifth Day of April, 1994

Attest:

BRUCE LEHMAN

Attesting Officer

Commissioner of Patents and Trademarks